(12) United States Patent
Bolt et al.

(10) Patent No.: US 7,418,458 B2
(45) Date of Patent: Aug. 26, 2008

(54) METHOD FOR ESTIMATING EXAMINEE ATTRIBUTE PARAMETERS IN A COGNITIVE DIAGNOSIS MODEL

(75) Inventors: Daniel Bolt, Madison, WI (US); Jianbin Fu, Washington, DC (US)

(73) Assignee: Educational Testing Service, Princeton, NJ (US)

( * ) Notice: Subject to any disclaimer, the term of this patent is extended or adjusted under 35 U.S.C. 154(b) by 347 days.

(21) Appl. No.: 11/100,364

(22) Filed: Apr. 6, 2005

(65) Prior Publication Data

US 2005/0222799 A1 Oct. 6, 2005

Related U.S. Application Data

(60) Provisional application No. 60/559,922, filed on Apr. 6, 2004.

(51) Int. Cl.
*G06F 17/30* (2006.01)
*G06F 15/16* (2006.01)

(52) U.S. Cl. ........................ 707/102; 707/100

(58) Field of Classification Search ................. 707/100, 707/102
See application file for complete search history.

(56) References Cited

U.S. PATENT DOCUMENTS

| | | | |
|---|---|---|---|
| 6,260,033 B1 | 7/2001 | Tatsuoka | |
| 2003/0232314 A1* | 12/2003 | Stout et al. | 434/322 |
| 2007/0179827 A1* | 8/2007 | Gupta et al. | 705/8 |

FOREIGN PATENT DOCUMENTS

WO    WO 2005/101244 A2    10/2005

OTHER PUBLICATIONS

Dibello et al., Unified Cognitive/Psychometric Diagnostic Assessment Likelihood-Based Classification Techniques, 1995, Cognitively Diagnostic Assessment, Nichols et al. eds., Hillsdale, NJ., pp. 361-389.
Masters et al., The Essential Process in a Family of Measurement Models, 1984, Psychometrika, 49(4):529-544.
Mislevy, Recent Developments in the Factor Analysis of Categorical Variables, 1986, J. Educ. Stat. 11(1):3-31.
Samejima, Estimation of Latent Ability Using a Response Pattern of Graded Scores, 1969, Psychometrika Monograph 17, 34(4-part 2).

(Continued)

*Primary Examiner*—Tony Mahmoudi
(74) *Attorney, Agent, or Firm*—Mayer Brown LLP

(57) ABSTRACT

A method and system for determining attribute score levels from an assessment are disclosed. An assessment includes items each testing for at least one attribute. A first distribution is generated having a response propensity represented by a highest level of execution for each attribute tested by the item. An item threshold is determined for at least one score for the first distribution. Each item threshold corresponds to a level of execution corresponding to the score for which the item threshold is determined. For each attribute tested by the item, a second distribution is generated having a response propensity represented by a lowest level of execution for the attribute and the highest level of execution for all other attributes tested by the item. A mean parameter is determined for the second distribution. An attribute score level is determined for the scores based on the item thresholds and the mean parameters.

7 Claims, 3 Drawing Sheets

OTHER PUBLICATIONS

Spiegelhalter et al., WinBUGS User Manual (Version 1.4). MRC Biostatistics Unit, Cambridge, 2003.

Spray, Multiple-Attempt, Single-Item Response Models, In van der Linden et al. eds., Handbook of Modern Item Repsonse Theory, 2001, New York, Springer pp. 209-220.

Tatsuoka, Toward an integration of Item-Response Theory and Cognitive Error Diagnosis, In Fredriksen et al. eds., Diagnostic Monitoring of Skill and Knowledge Acquisition, 1990, Hillsdale, NJ, Lawrence Erlbaum Associates, pp. 453-488.

Samejima, Graded Response Model in Handbook of Modern Item Response Theory, VanderLinden et al. eds., Springer, 1997, pp. 85-100, New York.

International Application of PCT Application No. PCT/US2005/011715, May 21, 2008, 3 pages.

* cited by examiner

METHOD FOR ESTIMATING EXAMINEE ATTRIBUTE PARAMETERS IN A COGNITIVE DIAGNOSIS MODEL

RELATED APPLICATIONS AND CLAIM OF PRIORITY

This application claims priority to, and incorporates herein by reference, U.S. provisional patent application No. 60/559,922, entitled "A Polytomous Extension of the Fusion Model and Its Bayesian Parameter Estimation," and filed Apr. 6, 2004.

TECHNICAL FIELD

The embodiments disclosed herein generally relate to the field of assessment evaluation. The embodiments particularly relate to methods for evaluating assessment examinees on a plurality of attributes based on responses to assessment items.

BACKGROUND

Standardized testing is prevalent in the United States today. Such testing is often used for higher education entrance examinations and achievement testing at the primary and secondary school levels. The prevalence of standardized testing in the United States has been further bolstered by the No Child Left Behind Act of 2001, which emphasizes nationwide test-based assessment of student achievement.

The typical focus of research in the field of assessment measurement and evaluation has been on methods of item response theory (IRT). A goal of IRT is to optimally order examinees along a low dimensional plane (typically unidimensional) based on the examinee's responses and the characteristics of the test items. The ordering of examinees is done via a set of latent variables presupposed to measure ability. The item responses are generally considered to be conditionally independent of each other.

The typical IRT application uses a test to estimate an examinee's set of abilities (such as verbal ability or mathematical ability) on a continuous scale. An examinee receives a scaled score (a latent trait scaled to some easily understood metric) and/or a percentile rank. The final score (an ordering of examinees along a latent dimension) is used as the standardized measure of competency for an area-specific ability.

Although achieving a partial ordering of examinees remains an important goal in some settings of educational measurement, the practicality of such methods is questionable in common testing applications. For each examinee, the process of acquiring the knowledge that each test purports to measure seems unlikely to occur via this same low dimensional approach of broadly defined general abilities. This is, at least in part, because such testing can only assess a student's abilities generally, but cannot adequately determine whether a student has mastered a particular ability or not.

Because of this limitation, cognitive modeling methods, also known as skills assessment or skills profiling, have been developed for assessing students' abilities. Cognitive diagnosis statistically analyzes the process of evaluating each examinee on the basis of the level of competence on an array of skills and using this evaluation to make relatively fine-grained categorical teaching and learning decisions about each examinee. Traditional educational testing, such as the use of an SAT score to determine overall ability, performs summative assessment. In contrast, cognitive diagnosis performs formative assessment, which partitions answers for an assessment examination into fine-grained (often discrete or dichotomous) cognitive skills or abilities in order to evaluate an examinee with respect to his level of competence for each skill or ability. For example, if a designer of an algebra test is interested in evaluating a standard set of algebra attributes, such as factoring, laws of exponents, quadratic equations and the like, cognitive diagnosis attempts to evaluate each examinee with respect to each such attribute. In contrast, summative analysis simply evaluates each examinee with respect to an overall score on the algebra test.

Numerous cognitive diagnosis models have been developed to attempt to estimate examinee attributes. In cognitive diagnosis models, the atomic components of ability, the specific, finely grained skills (e.g., the ability to multiply fractions, factor polynomials, etc.) that together comprise the latent space of general ability, are referred to as attributes. Due to the high level of specificity in defining attributes, an examinee in a dichotomous model is regarded as either a master or non-master of each attribute. The space of all attributes relevant to an examination is represented by the set $\{a_1, \ldots, a_k\}$. Given a test with items $i=1, \ldots, I$, the attributes necessary for each item can be represented in a matrix of size $I \times K$. This matrix is referred to as a Q-matrix having values $Q=\{q_{ik}\}$, where $q_{ik}=1$ when attribute k is required by item i and $q_{ik}=0$ when attribute k is not required by item i. Typically, the Q-matrix is constructed by experts and is pre-specified at the time of the examination analysis.

Cognitive diagnosis models can be sub-divided into two classifications: compensatory models and conjunctive models. Compensatory models allow for examinees who are non-masters of one or more attributes to compensate by being masters of other attributes. An exemplary compensatory model is the common factor model. High scores on some factors can compensate for low scores on other factors.

Numerous compensatory cognitive diagnosis models have been proposed including: (1) the Linear Logistic Test Model (LLTM) which models cognitive facets of each item, but does not provide information regarding the attribute mastery of each examinee; (2) the Multicomponent Latent Trait Model (MLTM) which determines the attribute features for each examinee, but does not provide information regarding items; (3) the Multiple Strategy MLTM which can be used to estimate examinee performance for items having multiple solution strategies; and (4) the General Latent Trait Model (GLTM) which estimates characteristics of the attribute space with respect to examinees and item difficulty.

Conjunctive models, on the other hand, do not allow for compensation when critical attributes are not mastered. Such models more naturally apply to cognitive diagnosis due to the cognitive structure defined in the Q-matrix and will be considered herein. Such conjunctive cognitive diagnosis models include: (1) the DINA (deterministic inputs, noisy "AND" gate) model which requires the mastery of all attributes by the examinee for a given examination item; (2) the NIDA (noisy inputs, deterministic "AND" gate) model which decreases the probability of answering an item for each attribute that is not mastered; (3) the Disjunctive Multiple Classification Latent Class Model (DMCLCM) which models the application of non-mastered attributes to incorrectly answered items; (4) the Partially Ordered Subset Models (POSET) which include a component relating the set of Q-matrix defined attributes to the items by a response model and a component relating the Q-matrix defined attributes to a partially ordered set of knowledge states; and (5) the Unified Model which combines the Q-matrix with terms intended to capture the influence of incorrectly specified Q-matrix entries.

The Unified Model specifies the probability of correctly answering an item $X_{ij}$ for a given examinee j, item i, and set of attributes k=1, ..., K as:

$$P(X_{ij} = 1 \mid \alpha_j, \theta_j) = \\ (1-p)\left[d_j \prod_{k=1}^{K} \pi_{ik}^{\alpha_{jk} \times q_{ik}} r_{ik}^{(1-\alpha_{jk}) \times q_{ik}} P_i(\theta_j + \Delta c_i) + (1-d_i)P_i(\theta_j)\right],$$

where
- $\theta_j$ is the latent trait of examinee j; p is the probability of an erroneous response by an examinee that is a master; $d_i$ is the probability of selecting the pre-defined Q-matrix strategy for item i;
- $\pi_{ik}$ is the probability of correctly applying attribute k to item i given mastery of attribute k; $r_{ik}$ is the probability of correctly applying attribute k to item i given non-mastery of attribute k; $a_{jk}$ is an examinee attribute mastery level, and $c_i$ is a value indicating the extent to which the Q-matrix entry for item i spans the latent attribute space.

One problem with the Unified Model is that the number of parameters per item is unidentifiable. The Reparameterized Unified Model (RUM) attempted to reparameterize the Unified Model in a manner consistent with the original interpretation of the model parameters. For a given examinee j, item i, and Q-matrix defined set of attributes k=1, ..., K, the RUM specifies the probability of correctly answering item $X_{ij}$ as:

$$P(X_{ij} \mid \alpha_j, \theta_j) = \pi_i^* \prod_{k=1}^{K} r_{ik}^{*(1-\alpha_{jk}) \times q_{ik}} P_{c_i}(\theta_j),$$

where $$\pi_i^* = \prod_{k=1}^{K} \pi_{ik}^{q_{ik}}$$

(the probability of correctly applying all K Q-matrix specified attributes for item i), $$r_{ik}^* = \frac{r_{ik}}{\pi_{ik}}$$

(the penalty imposed for not mastering attribute k), and $$P_{c_i}(\theta_j) = \frac{e^{(\theta_j + c_i)}}{1 + e^{(\theta_j + c_i)}}$$

(a measure of the completeness of the model).

The RUM is a compromise of the Unified Model parameters that allow the estimation of both latent examinee attribute patterns and test item parameters.

Another cognitive diagnosis model derived from the Unified Model is the Fusion Model. In the Fusion Model, the examinee parameters are defined $\underline{a}_j$, a K-element vector representing examinee j's mastery/non-mastery status on each of the attributes specified in the Q matrix. For example, if a test measures five skill attributes, an examinee's $\underline{a}_j$ vector might be '11010', implying mastery of skill attributes 1, 2 and 4, and non-mastery of attributes 3 and 5. The examinee variable $\theta_j$ is normalized as in traditional IRT applications (mean of 0, variance of 1). The probability that examinee j answers item i correctly is expressed as:

$$P(X_{ij} \mid \underline{\alpha}_j, \theta_j) = \pi_i^* \prod_{k=1}^{K} r_{ik}^{*(1-\alpha_{jk}) \times q_{ik}} P_{c_i}(\theta_j)$$

where
- $\pi_i^*$ is the probability of correctly applying all K Q-matrix specified attributes for item i, given that an examinee is a master of all of the attributes required for the item,
- $r_{ik}^*$ is the ratio of (1) the probability of successfully applying attribute k on item i given that an examinee is a non-master of attribute k and (2) the probability of successfully applying attribute k on item i given that an examinee is a master of attribute k, and $$P_{c_i}(\theta_j) = \frac{1}{1 + e^{-(\theta_j + c_i)}}$$

is the Rasch Model with easiness parameter $c_i$ ($0 \leq c_i \leq 3$) for item i.

Based on this equation, it is common to distinguish two components of the Fusion Model: (1) the diagnostic component:

$$\pi_i^* \prod_{k=1}^{K} r_{ik}^{*(1-\alpha_{jk}) \times q_{ik}},$$

which is concerned with the influence of the skill attributes on item performance, and (2) the residual component: $P_{c_i}(\theta_j)$, which is concerned with the influence of the residual ability. These components interact conjunctively in determining the probability of a correct response. That is, successful execution of both the diagnostic and residual components of the model is needed to achieve a correct response on the item.

The $r_{ik}^*$ parameter assumes values between 0 and 1 and functions as a discrimination parameter in describing the power of the ith item in distinguishing masters from non-masters on the kth attribute. The $r_{ik}^*$ parameter functions as a penalty by imposing a proportional reduction in the probability of correct response (for the diagnostic part of the model) for a non-master of the attribute, assuming the attribute is needed to solve the item. The $c_i$ parameters are completeness indices, indicating the degree to which the attributes specified in the Q-matrix are "complete" in describing the skills needed to successfully execute the item. Values of $c_i$ close to 3 represent items with high levels of completeness; values close to 0 represent items with low completeness.

The item parameters in the Fusion model have a prior distribution that is a Beta distribution, β(a, b), where (a, b) are defined for each set of item parameters, $\pi^*$, $r^*$, and c/3. Each set of hyperparameters is then estimated within the MCMC chain to determine the shape of the prior distribution.

One difference between the RUM and Fusion Model is that the $a_{jk}$ term is replaced in the Fusion Model with a binary indicator function, $I(\bar{a}_{jk} > \kappa_k)$, where $\bar{a}_{jk}$ is the underlying continuous variable of examinee j for attribute k (i.e., an examinee attribute value), and $\kappa_k$ is the mastery threshold value that $\bar{a}_{jk}$ must exceed for $a_{jk}=1$.

MCMC algorithms estimate the set of item (b) and latent examinee ($\theta$) parameters by using a stationary Markov chain, $(A^0, A^1, A^2, \ldots)$, with $A^t = (b^t, \theta^t)$. The individual steps of the chain are determined according to the transition kernel, which is the probability of a transition from state t to state t+1, $P[(b^{t+1}, \theta^{t+1})|(b^t, \theta^t)]$. The goal of the MCMC algorithm is to use a transition kernel that will allow sampling from the posterior distribution of interest. The process of sampling from the posterior distribution can be evaluated by sampling from the distribution of each of the different types of parameters separately. Furthermore, each of the individual elements of the vector can be sampled separately. Accordingly, the posterior distribution to be sampled for the item parameters is $P(b_i|X, \theta)$ (across all i) and the posterior distribution to be sampled for the examinee parameters is $P(\theta_j|X, b)$ (across all j).

One problem with MCMC algorithms is that the choice of a proposal distribution is critical to the number of iterations required for convergence of the Markov Chain. A critical measure of effectiveness of the choice of proposal distribution is the proportion of proposals that are accepted within the chain. If the proportion is low, then many unreasonable values are proposed, and the chain moves very slowly towards convergence. Likewise, if the proportion is very high, the values proposed are too close to the values of the current state, and the chain will converge very slowly.

While MCMC algorithms suffer from the same pitfalls of JML optimization algorithms, such as no guarantee of consistent parameter estimates, a potential strength of the MCMC approaches is the reporting of examinee (binary) attribute estimates as posterior probabilities. Thus, MCMC algorithms can provide a more practical way of investigating cognitive diagnosis models.

Different methods of sampling values from the complete conditional distributions of the parameters of the model include the Gibbs sampling algorithm and the Metropolis-Hastings within Gibbs (MHG) algorithm. Each of the cognitive diagnosis models fit with MCMC used the MHG algorithm to evaluate the set of examinee variables because the Gibbs sampling algorithm requires the computation of a normalizing constant. A disadvantage of the MHG algorithm is that the set of examinee parameters are considered within a single block (i.e., only one parameter is variable while other variables are fixed). While the use of blocking speeds up the convergence of the MCMC chain, efficiency may be reduced. For example, attributes with large influences on the likelihood may overshadow values of individual attributes that are not as large.

One problem with current cognitive diagnosis models is that they do not adequately evaluate examinees on more than two skill levels, such as master and non-master. While some cognitive diagnosis models do attempt to evaluate examinees on three or more skill levels, the number of variables used by such models is excessive.

Accordingly, what is needed is a method for performing cognitive diagnosis using a model that evaluates examinees on individual skills using polytomous attribute skill levels.

A further need exists for a method that considers each attribute separately when assessing examinees.

A still further need exists for a method of classifying examinees using a reduced variable set for polytomous attribute skill levels.

The present disclosure is directed to solving one or more of the above-listed problems.

SUMMARY

Before the present methods, systems and materials are described, it is to be understood that this invention is not limited to the particular methodologies, systems and materials described, as these may vary. It is also to be understood that the terminology used in the description is for the purpose of describing the particular versions or embodiments only, and is not intended to limit the scope of the invention which will be limited only by the appended claims.

It must also be noted that as used herein and in the appended claims, the singular forms "a," "an," and "the" include plural references unless the context clearly dictates otherwise. Thus, for example, reference to an "attribute" is a reference to one or more attributes and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the invention, the preferred methods, materials, and devices are now described. All publications mentioned herein are incorporated by reference. Nothing herein is to be construed as an admission that the invention is not entitled to antedate such disclosure by virtue of prior invention.

In an embodiment, a method for determining attribute score levels from an assessment may include, for at least one item, each testing at least one attribute, on the assessment, generating a first distribution having a response propensity represented by a highest level of execution for each attribute tested by the item, determining an item threshold for at least one score for the first distribution corresponding to a level of execution corresponding to the score, generating a second distribution for at least one attribute tested by the item having a response propensity represented by a lowest level of execution for the attribute and the highest level of execution for all other attributes tested by the item, determining a mean parameter for the second distribution, and determining an attribute score level for at least one score based on the at least one item threshold and the at least one mean parameter.

In an embodiment, a method for determining one or more examinee attribute mastery levels from an assessment may include receiving a covariate vector including a value for each of one or more covariates for the examinee for an examinee, and, for each of one or more attributes, computing an examinee attribute value based on at least the covariate vector and one or more responses made by the examinee to one or more questions pertaining to the attribute on an assessment, and assigning an examinee attribute mastery level for the examinee with respect to the attribute based on whether the examinee attribute value surpasses one or more thresholds.

In an embodiment, a system for determining attribute score levels from an assessment may include a processor, and a processor-readable storage medium in communication with the processor. The processor-readable storage medium may contain one or more programming instruction for performing a method of determining attribute score levels from an assessment including, for at least one item, each testing for at least one attribute, on the assessment, generating a first distribution having a response propensity represented by a highest level of execution for each attribute tested by the item, for at least one score, determining an item threshold for the first distribution corresponding to a level of execution corresponding to the score, for at least one attribute tested by the item, generating a second distribution having a response propensity represented by a lowest level of execution for the attribute and the highest level of execution for all other attributes tested by the item, and determining a mean parameter for the second distribution, and determining an attribute score level for at least one score based on the at least one item threshold and the at least one mean parameter.

BRIEF DESCRIPTION OF THE DRAWINGS

Aspects, features, benefits and advantages of the embodiments of the present invention will be apparent with regard to the following description, appended claims and accompanying drawings where:

DETAILED DESCRIPTION

Figure 1:
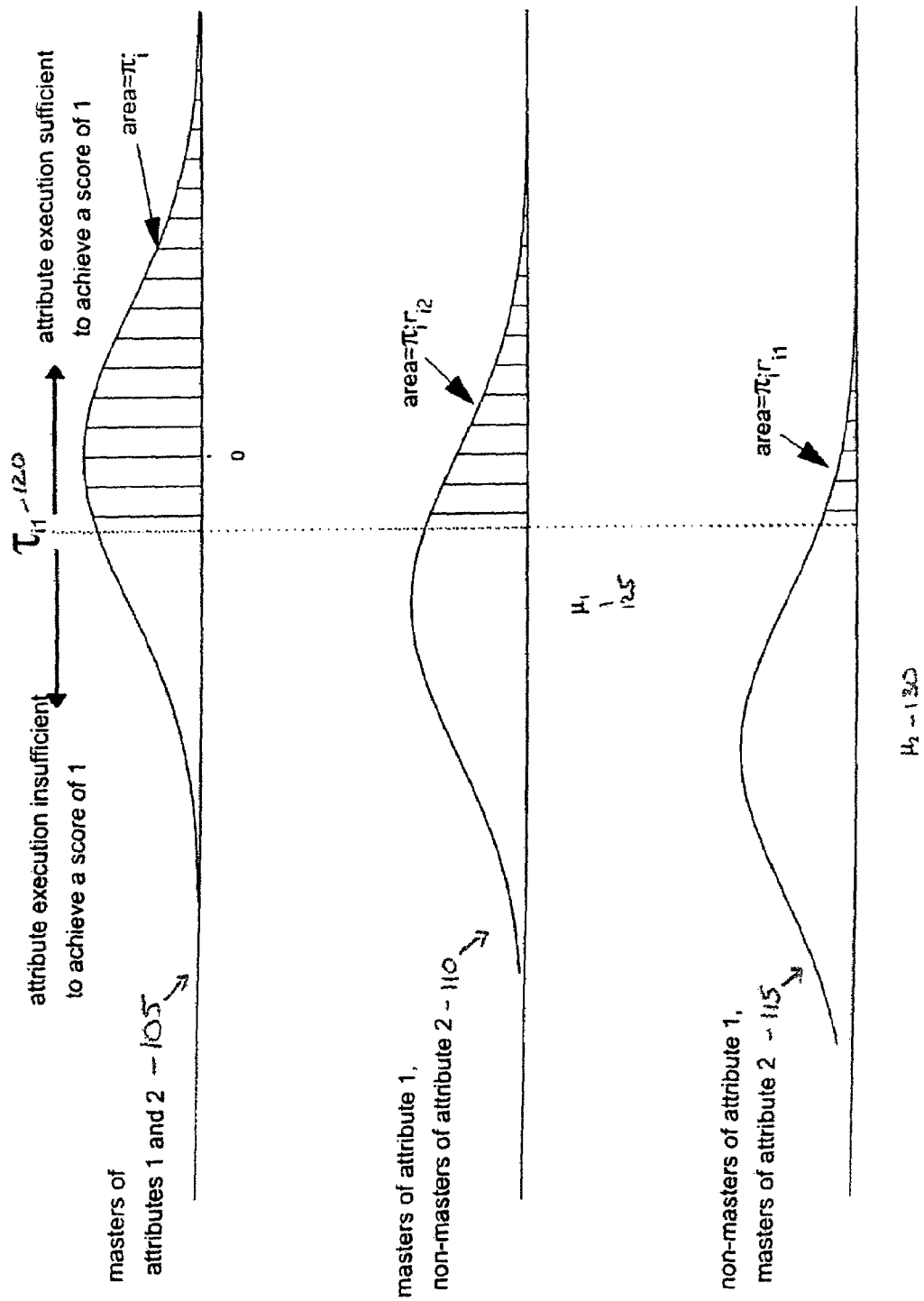
FIG. 1 illustrates an exemplary parameterization for the diagnostic part of a model for dichotomously scored items according to an embodiment.

The present disclosure discusses embodiments of the Fusion Model, described above, extended to cover polytomous attribute skill levels. The disclosed embodiments may generalize and extend the teachings of the Fusion Model for polytomously-scored items with ordered score categories.

In an embodiment, the cumulative score probabilities of polytomously-scored M-category items may be expressed as follows:

$$P^*_{im}(\underline{\alpha}_j, \theta_j) = P(X_{ij} \geq m \mid \underline{\alpha}_j, \theta_j) = \begin{cases} 1 & m = 0 \\ \pi^*_{im} \prod_{k=1}^{K} r^{*(1-\alpha_{jk}) \times q_{ik}}_{imk} P_{c_{im}}(\theta_j) & m = (1, \ldots, M_i - 1) \end{cases} \quad (1)$$

resulting in item score probabilities that may be expressed as follows:

$$P_{im}(\underline{\alpha}_j, \theta_j) = P(X_{ij} = m \mid \underline{\alpha}_j, \theta_j) = \begin{cases} P^*_{im}(\underline{\alpha}_j, \theta_j) - P^*_{i(m+1)}(\underline{\alpha}_j, \theta_j) & m = (0, \ldots, M_i - 2) \\ P^*_{im}(\underline{\alpha}_j, \theta_j) & m = M_i - 1 \end{cases} \quad (2)$$

where $\pi^*_{im}$ is the probability of sufficiently applying all item i required attributes to achieve a score of at least m, given that an examinee has mastered all required attributes for the item ($\pi^*_{i1} \geq \pi^*_{i2} \geq \ldots \geq \pi^*_{im}$);

$r^*_{imk}$ is the ratio of (1) the probability of sufficiently applying attribute k required for item i to achieve a score of at least m given that an examinee is a non-master of attribute k, and (2) the probability of sufficiently applying attribute k required for item i to achieve a score of at least m given that an examinee is a master of attribute k ($r^*_{i1k} \geq r^*_{i1k} \geq \ldots \geq r^*_{i1k}$); and $P_{c_{im}}(\theta_j)$ is a Rasch model probability with easiness parameter $c_{im}$, m=1, ..., M−1. The easiness parameters are ordered such that $c_{i1} > c_{i2} > \ldots > c_{i(M-1)}$.

A feature of the Fusion Model—its synthesis of a diagnostic modeling component with a residual modeling component—may be seen in Equation (1). In the dichotomous case, each item requires successful execution of both the diagnostic and residual parts of the model; that is, an overall correct response to an item occurs only when both latent responses are positive. In the polytomous case disclosed herein, where multiple score categories may be used, a different metric may be relevant. Instead of a correct response, the polytomous case may calculate whether an examinee's execution is sufficient to achieve a score of at least m, where m=0, 1, ..., M−1 (assuming an M-category item is scored 0, 1, ..., M−1). In other words, if the separate latent responses to the diagnostic and residual parts of the model are being scored 0, 1, 2, ..., M−1, an examinee may only receive a score of m or higher on the item when both latent responses are m or higher. When translated to actual item score probabilities in Equation (2), an examinee may achieve a score that is the minimum of what is achieved across both parts of the model.

Controlling the number of new parameters introduced to a polytomous cognitive diagnosis model is important in order to develop a computable model. If too many parameters exist, the processing power needed to compute examinee attribute skill levels using the model may be excessive. Based on Equation (1), every score category in every item (with the exception of the first score category) may include a $\pi^*_{im}$, a $c_{im}$, and as many $r^*_{imk}$ parameters as there are attributes needed to solve the item. This may result in too many parameters per item to make estimation feasible.

Alternate parameterization may be used to introduce a mechanism by which realistic constraints may be imposed on the diagnosis-related item parameters (the $\pi^*$'s and $r^*$'s), while also ensuring that all score category probabilities remain positive for examinees of all latent attribute mastery patterns and all residual ability levels.

FIG. 1 illustrates an exemplary parameterization for the diagnostic part of the model for dichotomously scored items according to an embodiment. As shown in FIG. 1, item i requires two attributes (attributes 1 and 2). Underlying normal distributions may represent the likelihood that an examinee in a particular class successfully executes all required attributes in solving the item. For example, the classes may include (1) examinees that have mastered both attributes 1 and 2 105; (2) examinees that have mastered attribute 1, but not attribute 2 110; and (3) examinees that have mastered attribute 2, but not attribute 1 115. An item threshold $\tau_{i1}$ 120 may define the location corresponding to the level of execution needed for a correct response. Accordingly, the area under the normal curve 105 above $\tau_{i1}$ for examinees that have mastered both attributes may be equivalent to $\pi^*_i$ in the Fusion model. The second normal distribution 110 may represent examinees who have mastered attribute 1, but not attribute 2. The second normal distribution 110 may have a mean parameter $\mu_{i1}$ 125 that is constrained to be less than 0 (the mean of the response propensity distribution for masters of both attributes), and a fixed variance of 1. The area above $\tau_{i1}$ for this class may be equal to $\pi^*_i \times r^*_{i2}$ in the ordinary Fusion Model parameterization. The third normal distribution 115 may represent examinees who have mastered attribute 2, but not attribute 1. The third normal distribution 115 may have a mean parameter $\mu_{i2}$ 130 that is constrained to be less than 0 (the mean of the response propensity distribution for masters of both attributes), and a fixed variance of 1. The area above $\tau_{i1}$ for this class may be equal to $\pi^*_i \times r^*_{i1}$ in the ordinary Fusion Model parameterization. As in the Fusion Model, the probability that an examinee that has not mastered either attribute will successfully execute them is equal to $\pi^*_i \mathrm{x} r^*_{i1} \mathrm{x} r^*_{i2}$.

As such, three parameters may be estimated for this item in the parameterization: $\tau_{i1}$ 120, $\mu_{i1}$ 125, and $\mu_{i2}$ 130. Each of these parameters may be directly translated into $\pi^*_1$, $r^*_{i1}$, and $r^*_{i2}$ based on the usual parameterization of the Fusion Model. The three classes considered above may thus be sufficient to determine the $\pi^*_1$, $r^*_{i1}$, and $r^*_{i2}$ parameters, which may be applied to determine the diagnostic component probability for the class that are non-masters of both attributes. In general, it may only be necessary to determine as many $\mu$ parameters as there are attributes for the item.

By parameterizing the model in this manner, the number of parameters for polytomously-scored items may be minimized. In a polytomously-scored item, additional item threshold parameters $\tau_{i2}, \tau_{i3}, \ldots, \tau_{i(M-1)}$ may be added for an M-category item (along with the additional threshold parameters $c_{i2}, c_{i3}, \ldots, c_{i(M-1)}$ for the residual part). The area under each normal distribution may be separated into M regions. The area of each region may represent a function of the $\pi^*$'s and $r^*$'s needed to reproduce the cumulative score probabilities in Equation (1).

Figure 2:
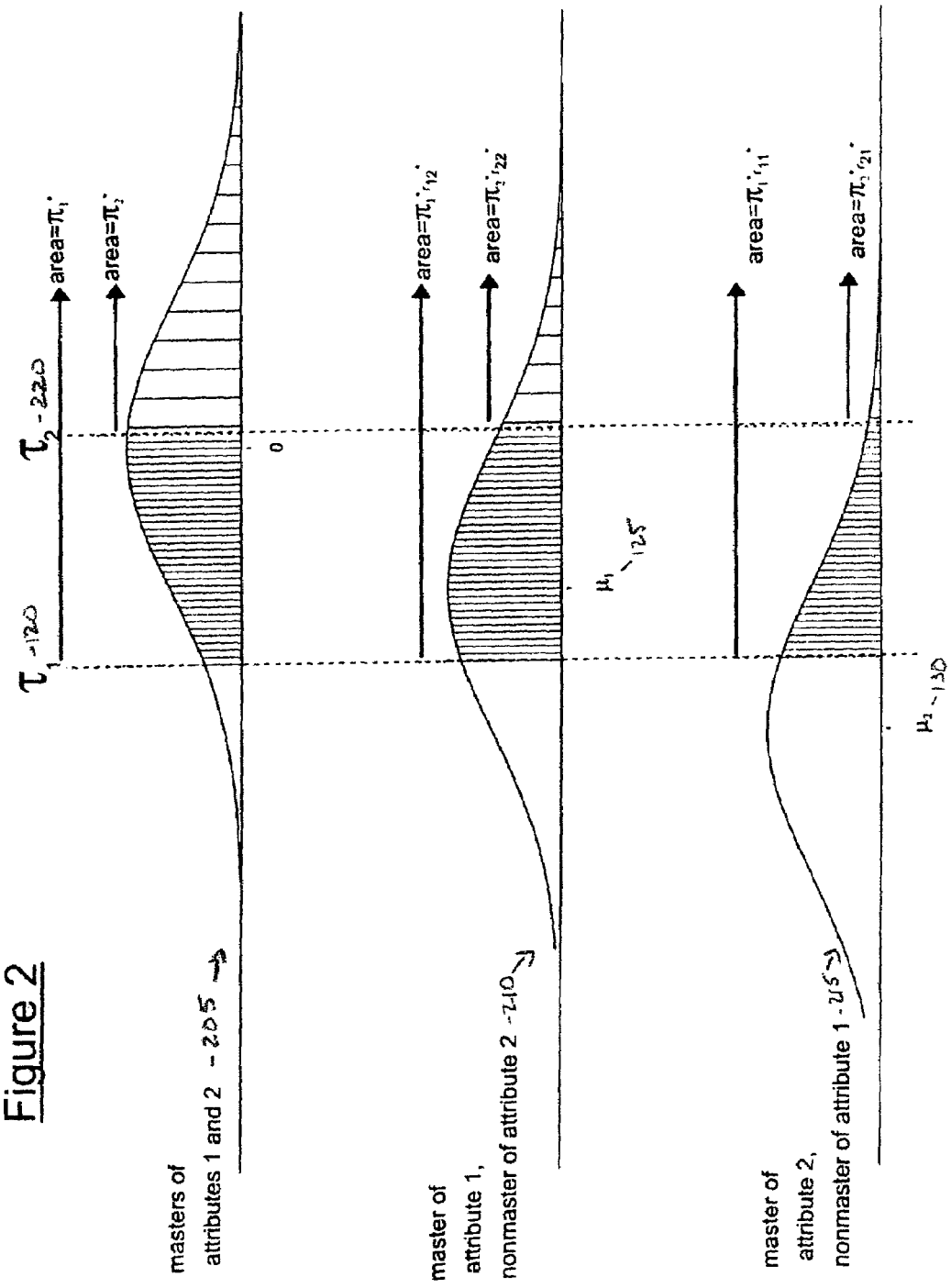
FIG. 2 illustrates an exemplary parameterization for the diagnostic part of a model for polytomously scored items according to an embodiment.

For example, as shown in FIG. 2, a three-category item (item scores 0, 1, and 2) may include two attributes. FIG. 2 is analogous to FIG. 1 except for an additional threshold parameter is added to account for the added score category. The cumulative score probabilities in Equation (1) may be a function of both a diagnostic component and a residual component. For examinees that have mastered both required attributes (i.e., examinees whose response propensities are represented by the top distribution), the probability of executing the attributes sufficiently well to achieve a score of at least 1 may be given by the area above the first threshold $\tau_{i1}$ 120 under the normal distribution 205. The probability of executing the attributes sufficiently well to achieve a score of at least 2 is given by the area above the second threshold $\tau_{i2}$ 220 under the normal distribution 205. For examinees that have failed to master the second attribute only, the areas above $\tau_{i1}$ and $\tau_{i2}$ in the second distribution 210 may likewise represent the probabilities of executing the attributes sufficiently well to obtain scores of at least 1 and 2, respectively. For examinees that have failed to master the first attribute only, the areas above $\tau_{i1}$ and $\tau_{i2}$ in the third distribution 215 may likewise represent the probabilities of executing the attributes sufficiently well to obtain scores of at least 1 and 2, respectively.

A Bayesian estimation strategy for the model presented in Equations (1) and (2) may be formally specified using the $\tau$, $\mu$, and c parameters that are estimated. The $\pi^*$'s and $r^*$'s may then be derived from these parameters. The $\tau$, $\mu$, and c parameters may be assigned non-informative uniform priors with order constraints to ensure positive score category probabilities under all conditions. For example, the following priors may be assigned:

$\tau_{i1} \sim \mathrm{Unif}(-5, 5)$,
$\tau_{im} \sim \mathrm{Unif}(\tau_{i(m-1)}, 5)$, for m=(2, ..., $M_i$-1)
$c_{i1} \sim \mathrm{Unif}(0, 3)$,
$c_{im} \sim \mathrm{Unif}(0, c_{i(m-1)})$, for m=(2, ..., $M_i$-1)
$\mu_{ik} \sim \mathrm{Unif}(-10, 0)$ for k=(1, ..., $K_i$) where $K_i$ is the number of attributes required by item i=(1, ..., I) in the Q-matrix.

From these parameters, the more traditional polytomous Fusion Model parameters in Equation (1) may be derived as follows:

$\pi^*_{im}$*32 $1-\Phi(\tau_{im})$ for m=(1, ..., $M_i$-1) where $\Phi$ denotes the cumulative density function (CDF) of a standard normal distribution; and $r^*_{imk} = [1-\Phi(\tau_{im}-\mu_{ik})]/\pi^*_{im}$ for m=(1, ..., $M_i$-1) and k=(1, ..., $K_i$).

The quantile range (−5, 5) may cover 99.99% of the area under a standard normal curve. This may imply vague priors between 0 and 1 for all $\pi^*_{im}$ and $r^*_{imk}$.

The correlational structure of the examinee attributes $a_j$ may be modeled through the introduction of a multivariate vector of continuous variables $\tilde{a}_j$ that is assumed to underlie the dichotomous attributes $a_j$. Similar to the theory underlying the computation of tetrachoric correlations, $\tilde{a}_j$ may be assumed to be a multivariate normal, with mean $\underline{0}$, a covariance matrix having diagonal elements of 1, and all correlations estimated. A K-element vector $\underline{\kappa}$ may determine the thresholds along $\tilde{a}_j$ that distinguish masters from non-masters on each attribute. Accordingly, the vector $\underline{\kappa}$ may control the proportion of masters on each attribute ($p_k$), where higher settings imply a smaller proportion of masters. Each element of $\underline{\kappa}$ may be assigned a normal prior with mean 0 and variance 1. Likewise, for the residual parameters $\theta_j$, normal priors may be imposed having mean 0 and variance 1.

In an embodiment, a covariance matrix $\Sigma$ may be used instead of the correlation matrix to specify the joint multivariate normal distribution for the $\tilde{a}$'s and $\theta$'s for each examinee. This covariance matrix may be assigned a non-informative inverse-Wishart prior with K+1 degrees of freedom and symmetric positive definite (K+1)×(K+1) scale matrix R, $\Sigma \sim \mathrm{Inv}\text{-}\mathrm{Wishart}_{K+1}(R)$. An informative inverse-Wishart prior for $\Sigma$ may also be used by choosing a larger number of degrees of freedom (DF) relative to the number of examinees, and scale matrix $R=E(R)*(DF-K-2)$ where $E(R)$ is the anticipated covariance (or correlation) matrix. Because the $\tilde{a}_{jk}$ are latent, they may have no predetermined metric. Accordingly, their variances may not be identified. However, such variances may only be required in determining $a_{jk}$. This indeterminacy may not affect the determination of the dichotomous $a_{jk}$ since the threshold $\kappa_k$ may adjust according to the variance of $\tilde{a}_{jk}$. This may result because the sampling procedure used for MCMC estimation may sample parameters from their full conditional distribution such that $\kappa_k$ is sampled conditionally upon $\tilde{a}_{jk}$. As a result, if the variances drift over the course of the chain, the $\kappa_k$ may tend to follow the variance drift such that the definition of attribute mastery remains largely consistent (assuming the mastery proportions are estimable). The latent attribute correlation matrix may be derived from the covariance matrix once a MCMC chain has finished.

In an embodiment, a covariance structure may be applied for the latent attribute correlations. For example, since many tests are substantially unidimensional in nature, the latent attribute correlations may conform to a single factor model. For an examinee j and an attribute k, this may be expressed as:

$$\tilde{a}_{jk} = \lambda_k F_j + e_{jk},$$

where
$F_j$ is the level on the second order factor underlying the attribute correlations for examinee j, specified to have mean 0 and variance 1;
$\lambda_k$ represents the factor loading for attribute k on the second order factor; and
$e_{jk}$ represents a uniqueness term with mean 0 across examinees and variance $\Psi_k$.

Accordingly, a new matrix $\Sigma^*$ based on the factor loadings and uniqueness variances may be used to replace the covariance matrix $\Sigma$ described above. $\lambda$ parameters may be sampled for each attribute in place of the covariance matrix $\Sigma$. In addition, $\Psi_k$ may be set to $(1-\lambda_k^2)$. As such, a consistent metric for the $\tilde{a}_{jk}$ parameters may be imposed with a variance of 1. In an embodiment, a uniform prior may be imposed on each $\lambda_k$ with bounds of, for example, 0.2 and 1.0.

Figure 3:
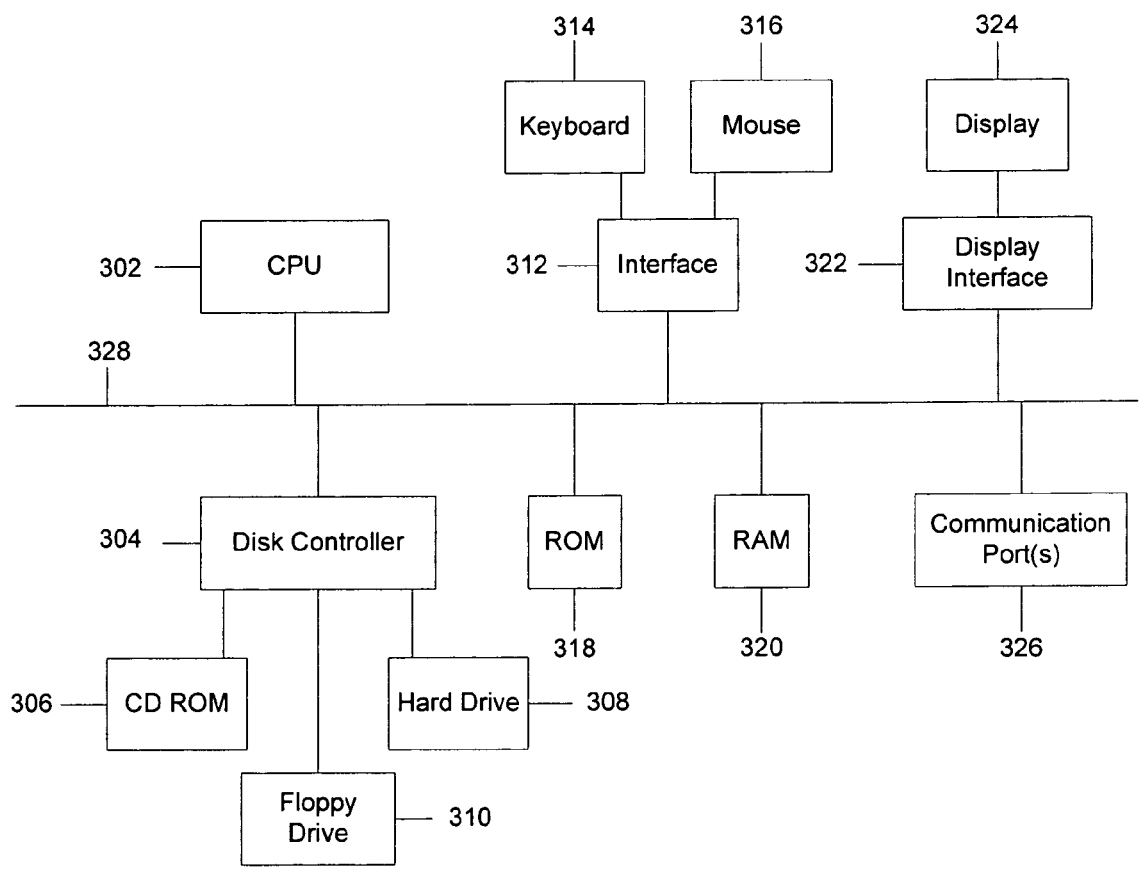
FIG. 3 is a block diagram of exemplary internal hardware that may be used to contain or implement program instructions according to an embodiment.

FIG. 3 is a block diagram of exemplary internal hardware that may be used to contain or implement program instructions according to an embodiment. Referring to FIG. 3, a bus 328 serves as the main information highway interconnecting the other illustrated components of the hardware. CPU 302 is the central processing unit of the system, performing calculations and logic operations required to execute a program. Read only memory (ROM) 318 and random access memory (RAM) 320 constitute exemplary memory devices.

A disk controller 304 interfaces with one or more optional disk drives to the system bus 328. These disk drives may be external or internal floppy disk drives such as 310, CD ROM drives 306, or external or internal hard drives 308. As indicated previously, these various disk drives and disk controllers are optional devices.

Program instructions may be stored in the ROM 318 and/or the RAM 320. Optionally, program instructions may be stored on a computer readable medium such as a floppy disk or a digital disk or other recording medium, a communications signal or a carrier wave.

An optional display interface 322 may permit information from the bus 328 to be displayed on the display 324 in audio, graphic or alphanumeric format. Communication with external devices may optionally occur using various communication ports 326. An exemplary communication port 326 may be attached to a communications network, such as the Internet or an intranet.

In addition to the standard computer-type components, the hardware may also include an interface 312 which allows for receipt of data from input devices such as a keyboard 314 or other input device 316 such as a remote control, pointer and/or joystick.

An embedded system may optionally be used to perform one, some or all of the disclosed operations. Likewise, a multiprocessor system may optionally be used to perform one, some or all of the disclosed operations.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the disclosed embodiments.

What is claimed is:

1. A method for determining one or more examinee attribute mastery levels from an assessment, the method comprising:

receiving a covariate vector for an examinee, wherein the covariate vector includes a value for each of one or more covariates for the examinee; and for each of one or more attributes:

computing an examinee attribute value based on at least the covariate vector and one or more responses made by the examinee to one or more questions pertaining to the attribute on an assessment; and assigning an examinee attribute mastery level for the examinee with respect to the attribute based on whether the examinee attribute value surpasses one or more thresholds, wherein a value in the covariate vector comprises the sum of a uniqueness term and the product of a second order factor and a factor loading, wherein the uniqueness term has a mean of zero across a set of examinees and a variance equal to one minus the factor loading squared, wherein the second order factor has a mean of zero and a variance of one.

2. The method of claim 1, wherein the factor loading has a uniform prior with bounds of approximately 0.2 and approximately 1.0.

3. A method for determining attribute score levels from an assessment, the method comprising:

for at least one item on the assessment, wherein the item tests for at least one attribute:

generating a first distribution having a response propensity represented by a highest level of execution for each attribute tested by the item;

for at least one score, determining an item threshold for the first distribution corresponding to a level of execution corresponding to the score;

for at least one attribute tested by the item:

generating a second distribution having a response propensity represented by a lowest level of execution for the attribute and the highest level of execution for all other attributes tested by the item;

determining a mean parameter for the second distribution; and determining an attribute score level for at least one score based on the at least one item threshold and the at least one mean parameter; and for at least one item, determining a completeness index for at least one score pertaining to the item, wherein determining the attribute score level for the at least one score is further based on the at least one completeness index.

4. The method of claim 3 wherein the completeness index for a first score is selected from a uniform distribution defined by Unif(0, 3).

5. The method of claim 4 wherein the completeness index for an mth score is selected from a uniform distribution defined by Unif(0, the completeness index for an (m−1)th score).

6. A method for determining attribute score levels from an assessment, the method comprising:

for at least one item on the assessment, wherein the item tests for at least one attribute:

generating a first distribution having a response propensity represented by a highest level of execution for each attribute tested by the item;

for at least one score, determining an item threshold for the first distribution corresponding to a level of execution corresponding to the score;

for at least one attribute tested by the item:

generating a second distribution having a response propensity represented by a lowest level of execution for the attribute and the highest level of execution for all other attributes tested by the item;

determining a mean parameter for the second distribution; and determining an attribute score level for at least one score based on the at least one item threshold and the at least one mean parameter, wherein the item threshold for a first distribution corresponding to a first score is selected from a uniform distribution defined by Unif(−5, 5) and wherein the item threshold corresponding to an mth score is selected from a uniform distribution defined by Unif (the item threshold corresponding to an (m−1)th score, 5).

7. A system for determining attribute score levels from an assessment, the system comprising:
  a processor; and
  a processor-readable storage medium in communication with the processor,
  wherein the processor-readable storage medium contains one or more programming instructions for performing a method of determining attribute score levels from an assessment, the method comprising:
  for at least one item on the assessment, wherein the item tests for at least one attribute:
  generating a first distribution having a response propensity represented by a highest level of execution for each attribute tested by the item;
  for at least one score, determining an item threshold for the first distribution corresponding to a level of execution corresponding to the score;
  for at least one attribute tested by the item:
  generating a second distribution having a response propensity represented by a lowest level of execution for the attribute and the highest level of execution for all other attributes tested by the item;
  determining a mean parameter for the second distribution; and
  determining an attribute score level for at least one score based on the at least one item threshold and the at least one mean parameter,
  for at least one item, determining a completeness index for at least one score pertaining to the item,
  wherein determining the attribute score level for the at least one score is further based on the at least one completeness index.

* * * * *